United States Patent [19]

Cummins

[11] Patent Number: 4,547,780
[45] Date of Patent: Oct. 15, 1985

[54] PRINTER WITH MANUAL PAPER FEED AND WEIGH SCALE INCORPORATING THE SAME

[75] Inventor: Robert P. Cummins, Minneapolis, Minn.

[73] Assignee: Fargo Electronic Services Inc., Eden Prairie, Minn.

[21] Appl. No.: 651,446

[22] Filed: Sep. 17, 1984

[51] Int. Cl.⁴ .............................................. G01D 9/02
[52] U.S. Cl. ....................................... 346/9; 346/79; 101/35; 400/124
[58] Field of Search ....................... 177/6, 8, 9, 10, 12, 177/13; 346/9, 11, 87, 82, 79; 400/88, 120, 121, 124, 126, 125; 101/93.05, 93.04, 35

[56] References Cited

U.S. PATENT DOCUMENTS

| 3,453,643 | 7/1969 | Amano et al. | 346/82 X |
|---|---|---|---|
| 3,718,244 | 2/1973 | Bukowski et al. | 400/61 |
| 3,767,020 | 10/1973 | Rowe | 101/93.05 X |
| 3,869,986 | 3/1975 | Hubbard | 400/126 X |
| 3,913,719 | 10/1975 | Frey | 400/126 X |
| 4,168,533 | 9/1979 | Schwartz | 400/88 X |
| 4,196,665 | 4/1980 | Rogers et al. | 101/93.05 X |
| 4,433,925 | 2/1984 | Fujiwara et al. | 400/88 |
| 4,492,157 | 1/1985 | Clark | 400/208 X |

FOREIGN PATENT DOCUMENTS 2414368 10/1975 Fed. Rep. of Germany ........ 101/35

OTHER PUBLICATIONS

Campbell et al., "Cartridge-Marking Mechanism"; IBM Technical Disclosure Bulletin; vol. 26, No. 3A, Aug. 1983, p. 1298.

Primary Examiner—Clifford D. Crowder
Attorney, Agent, or Firm—James V. Harmon

[57] ABSTRACT

A hand-fed printer for sheet material is described which includes an electronic print head, e.g., a dot matrix wire print head, a channel for cut sheets such as a slot that is open along one edge to receive and print the sheets. Sensors are provided for placing the print head in operation when the leading edge of the paper is sensed and for regulating the printing speed. An electronic data processor is connected to the print head to print letters and numbers on the sheet.

6 Claims, 6 Drawing Figures

PRINTER WITH MANUAL PAPER FEED AND WEIGH SCALE INCORPORATING THE SAME

FIELD OF THE INVENTION

This invention relates to electronic printers in which electronic data is used to energize an electronic print head to produce graphic symbols and to an electronic scale used in conjunction with such a printer.

BACKGROUND OF THE INVENTION

Electronic printers, often referred to as serial printers, print one or some portion of a character at a time as the printer moves along the length of the line, say, from left to right across the paper.

Electronic scales previously available utilize an electronic printer having a rotating drum with a helix or other mechanism for rapidly driving the electronic print head back and forth to produce successive lines of print. The electronic printer may be energized when moving in only one or both directions. The paper is advanced one line after each line is printed to space the lines an appropriate distance from one another.

Serial printers may be capable of printing an entire character at a time but more often print by composing a character through the selective actuation of a multiplicity of wires to form the characters from dots as the wires are selectively actuated while the print head traverses the paper with each character being formed by the deposition of dots of ink. The mechanism employed for repeatedly moving the print head from side to side to traverse the paper is complicated, expensive, and subject to wear. It also requires precision mechanical parts which occasionally get out of adjustment and need repair. Such traversing mechanisms also make the equipment bulky and increase the cost of the equipment significantly.

Printers of the general type described are not well suited for printing on a variety of different kinds of paper or other recording medium in sheet form. The present invention is particularly well suited for use as a printer for a weigh scale. In many applications utilizing such scales, great versatility is needed with respect to the sheet material upon which information is printed. Sheets may comprise small or large slips of paper, invoices, bills of lading that can be either card stock or paper. It may also comprise 8¼×11″ sheets or other larger size sheets of paper as well as documents or tickets of various sizes or sealed envelopes. Consequently, prior printers are limited as to the size, format, and thickness of the paper or other recording medium to be printed under the control of electronic data received from a scale or other source and supplied to the printer as electronic data signals that are fed through a data processor or other remote print signal source.

Other printers store paper in rolls and feed the roll stock from the storage roll to the print head but these devices can only be used to print on paper from the roll. In other equipment, complicated controls are needed for the carriage and for determining margins mechanically.

U.S. Pat. No. 4,021,608 is an example of an electronic data printer of the type using a continuous tape supplied from a roll stock. In accordance with the patent, tape is supplied from a roll tape dispenser and passed across a thermal print head where information is printed on the tape. On the tape can be printed only one line of type. The apparatus responses a paper drive mechanism and in addition is not suitable for printing cut sheets in a variety of sizes since only tape from the supply roll can be used.

U.S. Pat. No. 3,767,020 describes an automatic printer which is manually positionable for printing on articles of virtually any size. The printer is held in the hand and is moved manually across the article to be printed. While suitable for certain applications, the device is not satisfactory in applications with which the present invention is concerned. The primary objection is that the hand-held printer is unfamiliar and one must be trained to use it. It may also be awkward to use and likely to produce printed lines at various angles on the sheet. Consequently, the resulting printed copy may not have the desired appearance. Moreover, it is not suited for printing several lines parallel to one another or for printing lines which are parallel to the bottom edge of the sheet and centered on the sheet, that is to say, with equal margins on each side.

In view of the shortcomings of the prior art it is the general objective of the invention to overcome these problems and to provide a printer of simple construction with a manual paper feed and a stationary print head suited for printing on any type of recording medium. The recording medium may consist of units such as cut sheets of any size, tickets, documents, booklets, folders or even envelopes of various sizes. It is also an object to provide a device that without either a paper drive or a print head drive mechanism will print a line of type oriented along a predetermined axis with respect to the sides and edges of the sheet and yet requires no special operator training so that unskilled operators such as truck drivers, dock hands, warehouse workers, and others who are having articles weighed will find that the manner of using the printer to be immediately obvious.

These and other more detailed and specific objects will be apparent from the following description of the invention in which the invention will be described in more detail by way of example.

SUMMARY OF THE INVENTION

In brief terms, a printer suited for manual paper feed is provided for printing graphic alphanumeric information on cut sheets of any size. Printing is carried on while the sheet is being moved by hand past a stationary print head. The apparatus also has a slot or channel for at least partially enclosing the sheet during the printing operation. The channel has a supporting surface for engaging one edge, usually the lower edge of the sheet. The engagement between the lower edge of the sheet and the support establishes a base point for determining the height and orientation of a printed line with respect to the lower edge of the paper or other recording medium. A plurality of aligned paper or paper edge sensors are provided along the length of the channel adjacent to the print head and preferably with some sensors on either side of the print head. These sensors include one leading edge sensor for sensing the passage of the leading edge beyond a certain point into the channel to actuate a pulse generator and sensitize a second sensor. The first sensor when actuated starts a counter counting the pulses. When a second sensor is actuated the pulses are totaled. Electronic processing means is provided for (a) computing the paper feed rate from the total pulses and the distance between the sensors, (b) calculating the proper printing speed, i.e., operating speed of the printer, that is the speed at which data corresponding to numbers, letters, and symbols are printed, and (c) starting the print head.

In this way a speed measuring means is associated with the channel for detecting the speed of the sheet passing through it.

The print head is positioned adjacent to the channel for printing a line of alphanumeric or other graphic information on a sheet as the sheet moves past the head. One of the leading edge sensors e.g. the third one is operatively connected to the print head to start the print head when the leading edge of the sheet has reached the predetermined position. The operative connection between the third leading edge sensor and the print head can be thought of as a timing means responsive to the third edge sensor for starting the print head operation. Electronic data processing means is connected to the print head and to the speed measuring means for energizing the print head to (a) begin printing when the leading edge of the sheet passes the print head and (b) regulating the speed of printing to produce graphic information on the recording medium at the proper speed, i.e., in timed relationship with any speed the paper happens to be fed by hand to produce legible characters. The hand feeding of the sheet past the print head thus results in a printed line of information that is neither compressed nor evenly extended i.e. spread out on the sheet. The operative connection between one of the sensors and the print head establishes a base controlling the margin of the printed line with respect to the leading edge of the sheet. If desired a timing means may introduce a delay so that the margin is increased to any dimension selected. The height of the line from the lower edge of the sheet is determined by the distance between the print head and the lower edge of the slot or channel. The electronic printing head can comprise any suitable commercially available type such as a dot matrix printer otherwise known as a wire matrix print head of the kind having magnetically driven wires or other suitable printers such as a ink jet dot matrix printer or thermal dot matrix printer all of which are of well-known construction.

The invention will now be described by way of example with reference to the figures.

THE FIGURES

DETAILED DESCRIPTION

Figure 1:
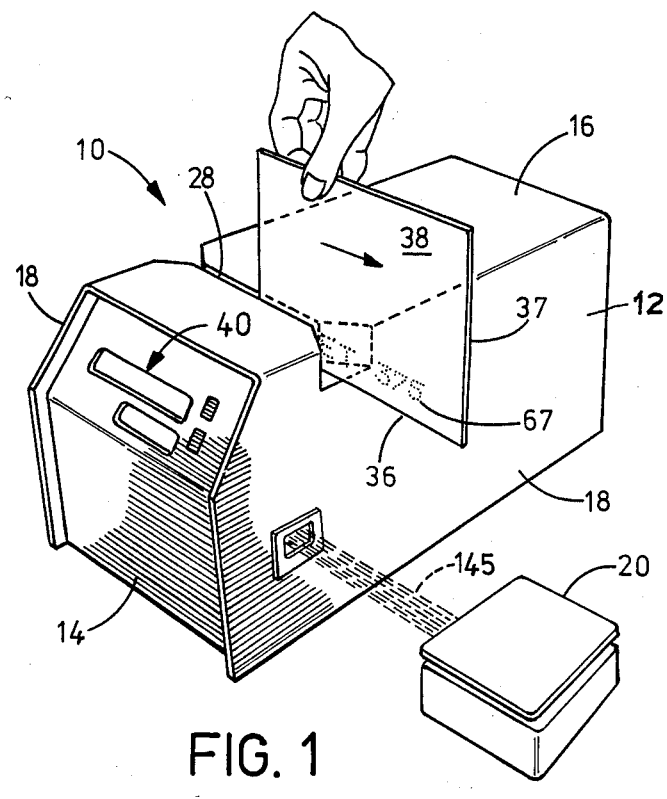
FIG. 1 is a perspective view of an apparatus embodying the invention.

In FIGS. 1 through 4 is shown a printer 10 in accordance with the invention having a housing 12 including a front wall 14, top wall 16, side walls 18 and a scale 20. It should be understood that the scale 20 can be made a part of the printer itself or placed in separate housing as shown.

It will be noted that in the top wall 16 includes a slot 28 which is often at each end adjacent to the side walls 18 and includes a V-shaped throat 19 at each end to help guide the paper into the narrow center portion of the slot. The slot includes transversely extending parallel vertically disposed narrowly spaced apart side walls 30 and 32 and a recording medium support wall 34 which defines the bottom wall of the slot that during operation functions to provide support for the bottom edge 36 of recording medium 38, e.g., in this instance comprises a cut sheet of paper.

During operation, the cut sheet 38 is placed into and advanced or fed through the slot 28 entirely by hand. In this case the sheet is inserted at the left end of the slot and is fed toward the left out the other end. It is held at the desired height, i.e., positioned in the proper place by means of the supporting wall 34. The V-shaped throats 19 while not essential are helpful in guiding the sheet 38 into the slot 28 and in making the operation of the apparatus obvious to a person not trained in its use. Operating control 40 such as an on/off button, print button, and indicator light can be provided on the front wall 14 as required. Other controls can be used if desired.

Figure 3:
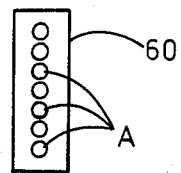
FIG. 3 is an enlarged vertical sectional view taken on line 3—3 of FIG. 2 showing the operating end of the dot matrix print head.
Figure 4:
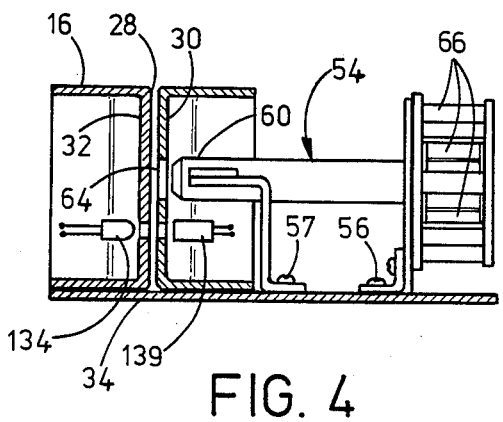
FIG. 4 is a vertical sectional view taken on 4—4 of FIG. 2.

Within the housing 12 is an electronic print head such as a dot matrix printer 54 is mounted upon brackets 56 and 57 with its operative or functional end 60 projecting somewhat toward the front of the printer through an opening 64 in the rear wall 30 of the slot 28. In this way the operating or printing end 60 of the electronic print head enters the slot 28 where the recording medium 38 is located in position to print alphanumeric information on the recording medium. The print head 54 in this instance comprises a serial type printer namely an electronic dot matrix printer of the type having a plurality of electromagnets 66 each coupled to one of several print wires A which extend from magnets 66 to the operative end 60 of the printer. The electronic printer otherwise known as a wire matrix print head in this case includes seven electromagnetically driven wires A. The wires are aligned vertically by means of vertically aligned guide openings in the end portion 60 (FIG. 3). As each respective electromagnet 66 is actuated, the free end of its corresponding wire A is driven on to the sheet 38 which is preferably of the type which darkens when pressure is applied otherwise known as carbonless carbon paper thereby leaving a dark dot and in that way forming graphic information on sheet 38 as shown at 67.

As the paper is moved by hand past the print head, the print wires A of the print head 54 will form dots on the sheet at the proper speed as will be described in more detail below thereby forming letters, numbers, or other graphic information. As this takes place it will be seen that the slot 30 which functions as a channel for at least partially enclosing the sheet material and its lower supporting surface 34 which engages the bottom edge 36 of the sheet 38 establishes a base point for determining the height of a printed line from the bottom edge of the sheet. Since the sheet is moved in a direction parallel to the bottom 34 of the slot 28, a line 67 is printed on the sheet parallel to the edge of the sheet engaging the bottom of the slot 28. While the electronic dot matrix printer 54 has been described as an electromagnetic wire matrix printer, other forms of electric dot printers such as thermal or dot matrix ink jet printers can be used if desired.

Figure 2:
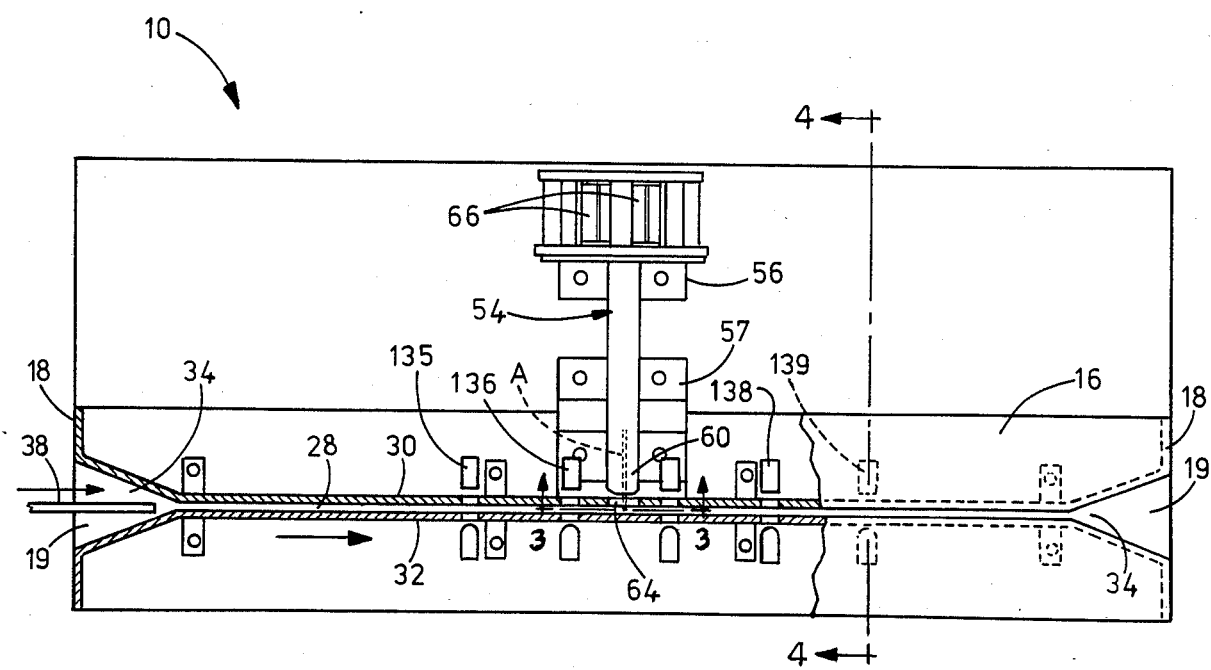
FIG. 2 is a partial plan view of the apparatus on a larger scale with the housing cores removed.
Figure 5:
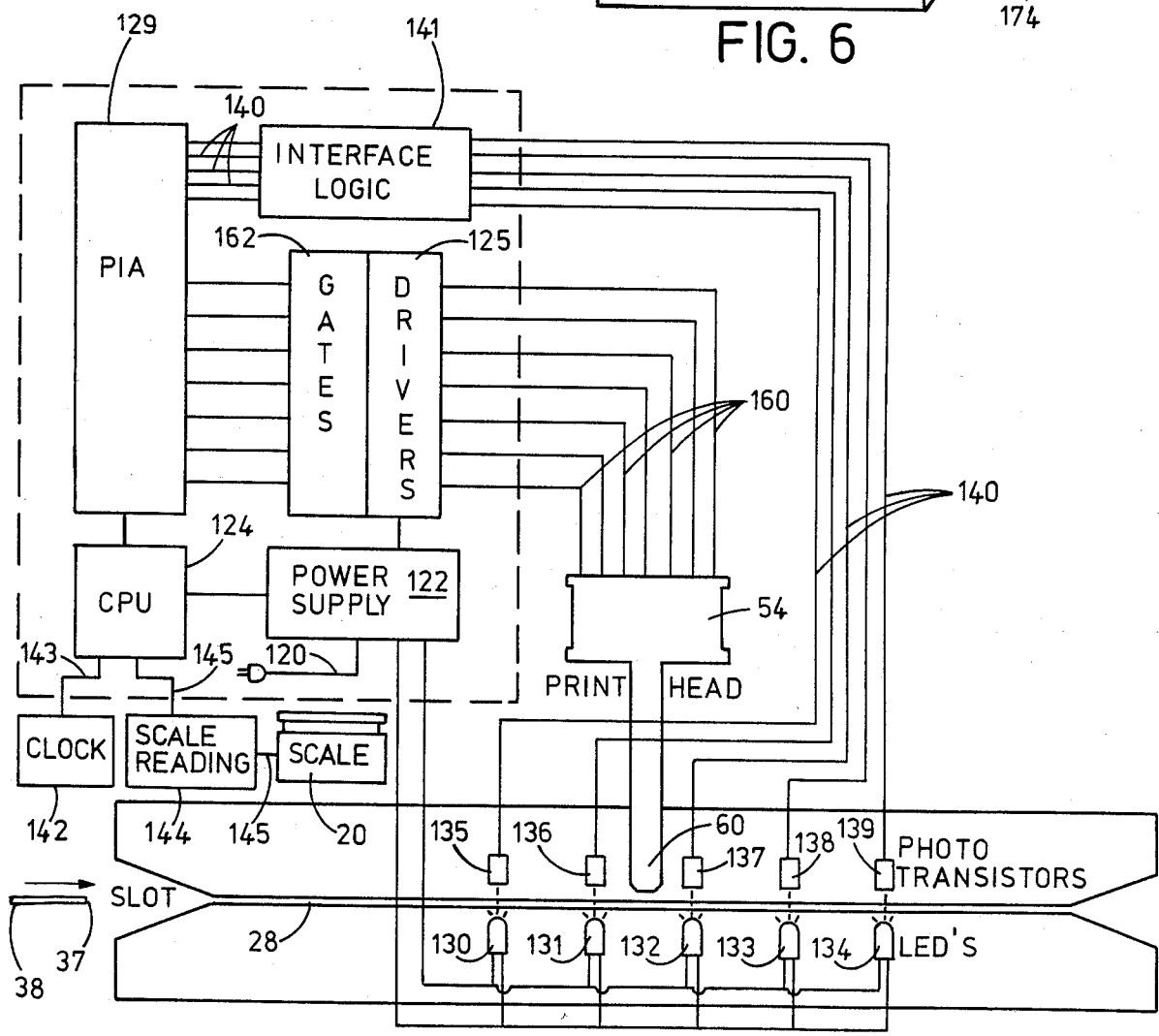
FIG. 5 is a diagramatic schematic view of typical circuitry used in conjunction with the invention.

The control of the printing and printing speed will now be described especially by reference to FIGS. 2 and 5. Current is provided through a line 120 to a power supply 122 for providing power to a central processing unit or microcomputer 124, gates 162, drivers 125, and peripheral interface adapter 129. The power supply 122 also supplies power to five light sources 130, 131, 132, 133 and 134 such as infrared light sources which are positioned to actuate photosensors 135, 136, 137, 138 and 139 respectively with each cooperating pair being located on opposite sides of the channel 28 with the photocells being positioned to transmit a beam across the channel or slot 28. Two pairs are on the left of the print head 54 and three are on the right of it. The photosensors 135–139 are wired via conductors 140 to microcomputer 124, through suitable interface logic 141 and the PIA 129.

Connected to the CPU 124 via conductor 143 is a clock 142 containing a pulse generator and pulse counter connected thereto for counting the pulses produced by the pulse generator. Also connected to the CPU via scale reading microprocessor 144 and conductor 145 is the scale 20.

The scale 20 is an electronic scale of any suitable known construction which is wired by means of several conductors 145 through a scale reading microcircuits means 144 to the CPU 124. The scale reading microcircuit 144 comprises suitable commercially available microcircuits known to the art which serve as a general purpose a microcircuit interface for weigh scales that produce a digital output. For example, the weigh scale 20 will in a typical situation produce 37 lines of digital information at a low voltage. The scale reading circuit 144 receives this electronic data from the scale and converts either BCD or serial data from the scale into 8 bit parallel data which can be read by the CPU 124 so that the data is in this way made compatible with the CPU 124 for expressing the weight being measured. For example, 5½ digits (199,999) may require say 22 lines connected to the microcomputer to express the data using the binary coded decimal, BCD, method. Nine additional lines can be provided to give additional information such as LB or KG, invalid weight, e.g., if the weight is in motion, over and under weights, etc. Data may also be transmitted to the printer head 54 via several serial methods of known art such as ASCII (American Standard Code for Information INterchange) serial data transmission at RS232C (ASCII serial data at RS232C) or current loop interface levels, etc. When a signal is received from the first photosensor 135 indicating the presence of the leading edge of a sheet, the CPU 124 is programmed to sensitize i.e. turn on sensor 136 so that it will be ready when the leading edge of the sheet passes it and at the same time start the pulse generator in the clock 142. Thus when the paper 38 activates sensor 135, the counter in the clock 142 starts to count pulses until sensor 136 is actuated at which time the total of the pulses is read and with a given space, e.g., 1", between sensors 139 and 136 the speed of the paper is computed through suitably programming the CPU 124. The speed of the paper is then recalculated as each successive sensor 137 and 138 is activated and at each calculation and recalculation the print speed or "dot" speed of the printer 54 is adjusted and readjusted to provide symbols and words 67 of the desired ledgible width for the speed at which the paper is moving.

The microcomputer 124 is programmed to fire the seven wires of the dot matrix printer 54 and to turn off the sensors after the trailing edge of the sheet permits the light beam from 133 to reach photocell 138. In addition, the microcomputer 124 keeps track of the time of day and date which can also be printed along with the weight data as well as other information received from the electronic scale 20. It will be understood by those skilled in the art that the microcomputer 124 is programmed internally to change formats suitably so as to convert the electronic pulses from the scale 20 to electronic data transmission synchronized with the speed of the paper traveling past the print head to produce alphanumeric symbols corresponding to the weight of the article on the scale 20 converted to letters, numbers, or other symbols.

As can be seen, sensors are provided on the upstream and downstream sides of the print head. The first sensor is used to determine the presence of the sheet and to begin speed determination by starting the counter at 142. Sensor 136 signals 124 to total the pulses counted between the time the sheet passes between the first and second sensors. Printing is not started until the leading edge of the sheet 37 is sensed by the third sensor 137. The CPU is programmed so that the printing is then started with the printing being performed at the rate corresponding to the speed calculated by the electronic data processing means within the CPU 124. A variety of controls 40 can be used. Besides an on/off switch, provision can be made for setting the time and date when printing is used in connection with the weigh scale. A switch can be provided if desired to adjust the paper print position, for example, a control 40 may be used to start printing at some predetermined interval after the leading edge of the sheet 37 is sensed by one of the sensors. In a typical situation, the apparatus may be set to start printing so that a 1¼-inch margin is established after the leading edge of the paper actuates the sensor 137. Each successive sensor is used to monitor the speed of the sheet. In general, more sensors are required for longer sheets of paper to assure that printing is accomplished at the proper speed at all times. While the print head 60 is shown between several sensors, it can if desired be positioned before the first sensor.

Assuming the paper is introduced into the channel 28 from left to right, the beam to sensor 135 will be broken first. The connection between the CPU 124 and the sensor allows the CPU to be ready to receive signals from sensor 1. When the CPU sees that the beam is broken, it starts the clock 142 that steps the CPU 124 through instructions provided in the program. After the first sensor 135 is actuated, the program of the CPU 124 directs operation into a loop with a known cycle time having an external pulse rate of, say, 3,000 cycles per second. The computer ignores these pulses until the CPU sees the sensor 135 has been actuated and then starts counting them. At the same time, it becomes sensitive to instructions from 136. When the signal is received from 136, the total number of pulses from the time 135 was actuated is counted and in this instance say 600 pulses were counted in the interval and since the pulse rate is known to be 3,000 cycles per second with one inch between the sensors 135 and 136, then by dividing 3,000 by 600, it is determined that the paper was traveling at 5 inches per second. The CPU is programmed to produce 10 characters per inch for easy reading and with 10 characters per inch, suitable programming is used to multiply 5 inches per second by 10 to determine that 50 characters per second must be printed. Since each character consists of 5 columns of dots each 7 dots high with 2 columns of margins, then 350 columns per second or the equivalent of 2.85 miliseconds per column is the time interval between each column with the paper fed at that particular speed. The determination of which pins are fired is established by the character set of the CPU and the information in our ROS which is one component of the CPU. As the sheet passes through the printer, the CPU continues to be ready to receive signals from the next successive sensor 137, 138, and 139 as the case may be. As this is done, the speed is recomputed during each time interval and the print head speed is adjusted correspondingly for the new speed calculated. It will be apparent that the print quality will vary with the distance between the sensors. In the circuit diagram, FIG. 5, it can be seen that the interface logic receives the signals from the sensors and converts them to TTL logic, i.e., binary signal at a lower voltage. The peripheral interface adapter allows the sensors to communicate with the digital CPU which has been preprogrammed to receive the information. The CPU is thus programmed to count the pulses from the clock 142 and calculate the speed repeatedly. It also, of course, must determine what characters will look like. This device tells the print head which dots to produce to form the desired characters.

While the apparatus will function satisfactorily with one speed calculation, it is preferable to provide at least two speed calculations. Additional calculations will provide even better accuracy.

The print head 54 can be of any suitable commercially known type such as print heads from Eaton Printer Products, Rivertown, Wyo. or from DH Electronics, Sunnyvale, Calif. or International Business Machines Corporation. The method by which a series of remote signals are used to form letters and numbers is well-known and is described in more detail in International Business Machines Corporation's publication 5213 *Printer Models* 1, 2, *and* 3 *Theory and Maintenance.* Right- and left-hand printing is described in U.S. Pat. No. 3,708,050 and a method of generating sequential print command signals for various processor-controlled printers via an ROS is shown in IBM Technical Disclosure Bulletin of July, 1970, Volume 13, Number 2, pages 343-344 in the article entitled, *Read-Only Store Computer Code to Dot Matrix Translator.* One suitable print head is described in U.S. Pat. No. 3,108,534. An example of typical logic circuitry employed in the present invention is more specifically described in a publication entitled, *Matrix II, Ticket and Tape Printer Maintenance and Repair Manual,* by Fargo Electronics Services, Eden Prairie, Mo. All of these publications are incorporated herein by reference.

When it is desired to print a number or letter, say the number 375, the bits corresponding to the number received from the electronic scale 20 are transmitted to the CPU 124 via conductor 145 through the scale reading circuit 144 which converts them to a bit form that is compatible with the microcomputer 124 where they are stored in a suitable register in which these bits form part of the address for those characters in the Read-Only Store (ROS) memory. The address of the number within the Read-Only Store memory is completed by an internal counter. Internal control logic enables the counter to periodically select any or all of the output lines 140 (FIG. 5) for energization. The same enabling signal will open gates 162. Each gate will be opened in turn under the control of the internal clock to energize the appropriate wires corresponding to the bits in storage representing the numbers (or letters) received from the scale 20. The speed of the paper calculated and recalculated as above determines the proper rate of the internal clock within the CPU 124 releases the impulses through the gates 162 to provide letters and numbers of the appropriate height and width for the speed at which the paper is moved. The same enabling signal sent to each of the gates 162 is amplified by drivers 125 to increase signals in lines 160 to a level required for driving the electromagnets 66 of the print head 54. The drivers 164 are connected to the print head by means of seven conductors 160 with the return side of each coil (not shown) wired to the power supply. While a photosensor 135 has been described to actuate the sensor 136, it can be replaced with a hand switch if desired. Other photocells 136-139 can be replaced by any suitable sensing means such as a microswitch or the like to signal the CPU as to (a) where the leading edge 37 of the sheet is located and (b) the speed of the sheets which respect to the next upstream sensor.

It can thus be seen that a printer of simple construction is provided which will print parallel to an edge of a document or other sheet material without a requirement for a drive motor or for any device for moving the print head. It will nevertheless print a line at whatever speed is required by the speed of the paper. The mechanism is easy to use and its operation is self-evident so that it can be easily understood by an untrained user.

Figure 6:
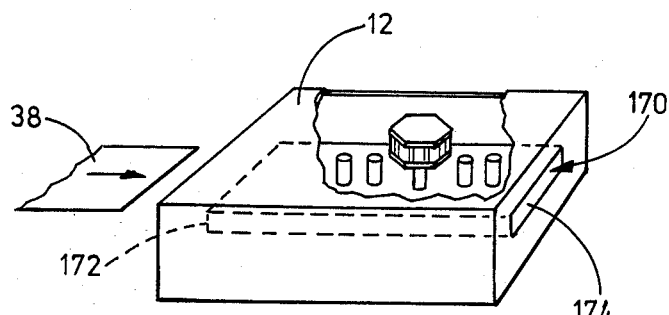
FIG. 6 is a modified form of the invention with a different form of channel.

The slot or channel 28 may have various forms. For example, in FIG. 6 which illustrates a variation of the invention wherein the same numerals refer to corresponding parts, the housing 12 is provided with a slot or channel 170 of rectangular cross-section having an inlet 172 and an outlet 174. The operation is similar to that already described. The apparatus of FIG. 6 will have an advantage where documents are all of exactly the same size or if they are to be printed in a horizontal position. Small sheets may however be difficult to move through the slot 170 at a uniform speed. This illustrates the advantage of the unit of FIGS. 1–5 wherein the paper 38 projects out of the top of the channel 28 allowing the paper to be held at all times.

In one possible way of operating the apparatus, no printing is carried out until the second photocell 136 has the light to it cut off by the sheet at which time printing is started by CPU 124. However, if the weigh scale data is not "valid", the sheet will pass through without actuating the print head. Validity is checked by monitoring the appropriate signal from the scale. The term "validity" herein refers to a scale reading that is assumed to be correct, for example by virtue of its constancy. This is done in some scales now in commercial use which are provided with circuitry to compare readings taken at short intervals to determine if the scale is in motion, thereby checking validity. Only when the readings are found valid will the printer be allowed to print. In another mode of operation, a light at 40 will come on when weight is determined to be "valid" at which time the operator will know it is time to pass the sheet through the slot. This alternate mode of operation can be established by appropriate programming the CPU 124. If desired, the microcomputer can be programmed to signal the scale 20 to repeat the weight readout until a valid weight is obtained so that printing can be started. If desired, provision can also be made in the programming so that nothing is printed until one of the print buttons at 40 is pushed to start the printing operation. After the paper has been run all the way through and its trailing end passes the last photocell 139, a signal therefrom through the CPU 124 will turn off the sensors 135-139.

Many variations of the invention will be apparent to those skilled in the art within the scope of the appended claims once the principles are understood.

What is claimed is:

1. A printer for printing on cut sheets fed therethrough by hand comprising:
   a stationary electronic matrix print head for printing alphanumeric information on said sheet,
   a channel adjacent to the print head for at least partially enclosing the sheet and having a means for positioning the sheet such that engagement between one edge of said sheet and the channel establishes a base point for determining the height of a printed line from the edge of the sheet,
   a pulse generator,
   a pulse counter,
   a first leading edge sensor means associated with the channel for starting the pulse generator,
   a means operatively connecting the counter to the pulse generator to count pulses starting when the first sensor is actuated by the leading edge of the sheet,
   a second leading edge sensor associated with the channel downstream of the first sensor and connected to the counter to stop the counter when energized by the sheet,
   electronic data processing means connected (a) to the counter to calculate the speed of the sheet from the pulses counted and connected (b) to the print head for energizing the print head to cause the print head to produce a printed line of said alphanumeric information on the sheet at a speed corresponding to the speed of the sheet thus calculated from the pulses counted.

2. The printer of claim 1 wherein there is at least one additional sheet edge sensor downstream from said second leading edge sensor and each such additional sensor is connected to the counter and data processing means for actuating the counter to count pulses generated in the interval during which the sheet moved between the additional sensor and the next upstream sensor, said processing mean thus recalculating the speed of the sheet and changing the speed of the printer to correspond thereto.

3. The apparatus of claim 1 wherein the electronic printing means is an electronic dot matrix printer having a plurality of electromagnets, aligned print wires positioned adjacent to the channel to form visible dots on the sheet or the sheet is moved by hand through the channel.

4. The apparatus of claim 1 wherein selectively adjustable time delay means is operatively associated between the second leading edge sensor means and the electronic data transmission means for delaying the transmission of electronic data to the print head for a predetermined time interval to move the leading edge of a printed line predetermined distance to the right on the sheet.

5. The apparatus of claim 1 in combination with a scale apparatus for printing out the weight determined by the scale.

6. The apparatus of claim 1 wherein calculator means is provided for recalculating the speed of the sheet through the apparatus during successive time intervals and means is provided to adjust the speed of the printer during said intervals to correspond with each recalculated speed of said sheet.

* * * * *

UNITED STATES PATENT AND TRADEMARK OFFICE
CERTIFICATE OF CORRECTION

PATENT NO. : 4,547,780
DATED     : October 15, 1985
INVENTOR(S) : Robert P. Cummins It is certified that error appears in the above-identified patent and that said Letters Patent is hereby corrected as shown below:

```
Column 4, line 15, change "left" to --- right ---.
Column 5, line 44, change "INterchange" to --- Inter-
change ---.
Column 7, line 36, after "Right" delete the dash.
Column 7, line 48, change "Mo" to --- MN ---.
Column 8, line 16, change "which" to --- with ---.
```

Signed and Sealed this

Eleventh Day of March 1986

[SEAL]

Attest:

DONALD J. QUIGG

Attesting Officer

Commissioner of Patents and Trademarks